Feb. 6, 1940.                    H. KREIDEL                    2,189,566
                          COUPLING FOR TUBES AND PIPES
                            Filed July 13, 1938            2 Sheets-Sheet 1

INVENTOR
Hans Kreidel
BY
Cooper, Kerr & Dunham
ATTORNEYS

Feb. 6, 1940.    H. KREIDEL    2,189,566
COUPLING FOR TUBES AND PIPES
Filed July 13, 1938    2 Sheets-Sheet 2
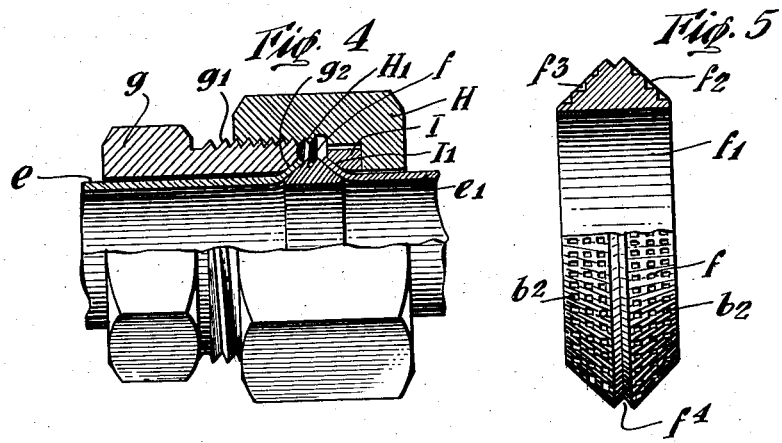
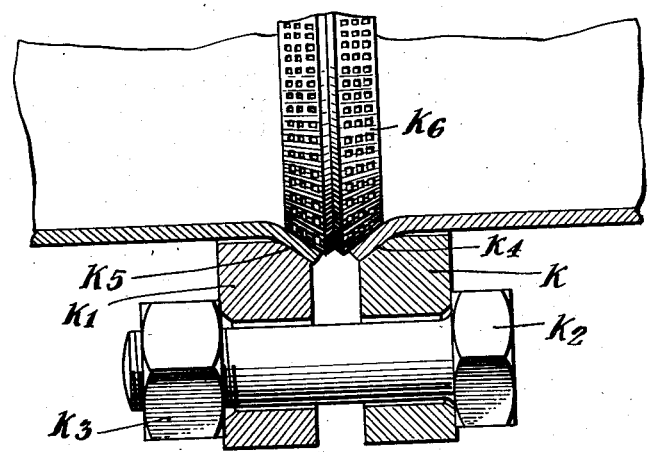
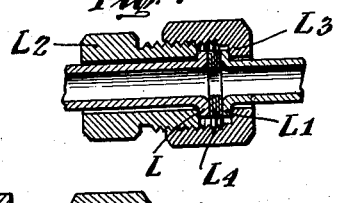
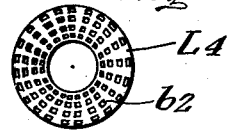
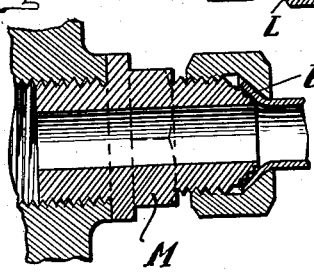
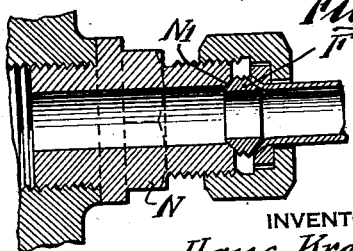
INVENTOR
Hans Kreidel
BY
Cooper, Kerr & Dunham
ATTORNEYS Patented Feb. 6, 1940

2,189,566

UNITED STATES PATENT OFFICE 2,189,566

COUPLING FOR TUBES AND PIPES

Hans Kreidel, Wiesbaden, Germany, assignor to Patex Societe Anonyme, Basel, Switzerland, a corporation of Switzerland Application July 13, 1938, Serial No. 218,901
In Germany December 30, 1937

3 Claims. (Cl. 285—122)

This invention relates to couplings for rigid or flexible pipes, and more particularly to couplings of the kind in which the inner surface of the end of the pipe, after having been flared conically or flanged perpendicularly to form a rim, is pressed by means of two coupling members which are adapted to be coupled together against a conical seating or a seating which is perpendicular to the axis of the pipe and which may be formed either on one of the coupling members or on a separate inserted piece.

In the known connections of this kind the seating against which the conically flared or flanged end of the pipe bears is smooth. This has the following disadvantages: When the nut is tightened, the pipe may be rotated with the nut since the flared or flanged end of the pipe can slide on the smooth surface of its seating, which has no means for preventing this.

When it is desired to join pipes made of a comparatively soft material such as tempered copper, for example, the tightening stress often flattens the flared or flanged end of the pipe against the smooth seating and thereby reduces its mechanical strength.

Since the end of the pipe is maintained against the smooth seating solely by the pressure exerted by the coupling members, it will readily be realized that the pressure of the confined fluid, or the effect of the tensile stresses or vibrations to which the pipe may be subjected, can easily cause the end of the pipe to become detached from its seating, while if the tensile stress is sufficiently great, the end of the pipe may even be entirely broken off.

The joint formed by pressing the conically flared mouth or the flanged end of the pipe against a smooth seating is often unreliable from the point of view of tightness, in particular when the thickness of the end of the pipe is not uniform or if its uniformity is not maintained when the coupling members are tightened.

The object of the present invention is to provide an improved pipe connection by which the above mentioned disadvantages are obviated.

According to the invention, the seating against which the flared or flanged end of the pipe is pressed is provided with small hollows or cavities, which are closed at the bottom and are of any desired shape, the effect of which is that, when the coupling is tightened, the material of the pipe is partly forced into the small cavities or hollows, so that the end of the pipe becomes anchored to its seating. The purpose of this is to ensure a perfectly tight joint, so that tensile stresses or vibrations to which the pipe may be subjected do not cause the end of the pipe to come away from its seating, and also to prevent the pipe from rotating when the coupling members are tightened. Finally, when the material of the pipe is forced into the hollows or cavities, the force applied in tightening the coupling need not be so great as to lengthen, and therefore reduce the thickness of the end of the tube to any considerable extent, both of which are factors which tend to produce rupture. In addition, the coupling can be assembled and disconnected as required, while absolute tightness is ensured when the coupling is re-connected.

In accordance with a further feature of the invention, the cavities or hollows provided in the seating against which the end of the pipe is pressed are arranged in the form of a checkerboard or grid-like design.

Preferably, the cavities are square and become narrower towards the bottom and are so arranged that two opposite sides are parallel or substantially parallel to the axis of the pipe to be connected, whereby the dismantling and re-assembly are facilitated.

In one preferred form of coupling, in accordance with the invention, the seating against which the pipe is pressed consists of a conical or bi-conical ring, the outside surface of which is provided with cavities arranged in checkerboard or grid-like formation as described above.

According to another form, a collar which is flanged on the end of the pipe, is pressed against a gasket, the outside surface of which is provided with similar cavities.

In order that the invention may be readily understood and carried into effect, various forms of pipe couplings in accordance with the invention are illustrated by way of example in the accompanying drawings, in which Figure 1 shows a section through one form of pipe coupling according to this present invention, before the parts are coupled together;

Fig. 4 shows a section through another form of pipe coupling in which the end of the pipe is pressed against a ring provided with cavities arranged in checkerboard formation;

Fig. 5 shows the ring of Fig. 4 on a larger scale;

Fig. 6 is a section through another form of coupling in which the end of the pipe is pressed against a separate inserted ring by means of two coupling members which are in the form of rings or flanges;

Fig. 7 is a section of a coupling in which a collar, which is flanged on the end of the pipe to be connected, is pressed against a gasket;

Fig. 8 shows, on a larger scale, the gasket employed in Fig. 7; and

Figs. 9 and 10 are sections showing two further forms of couplings according to the present invention.

Figure 1:
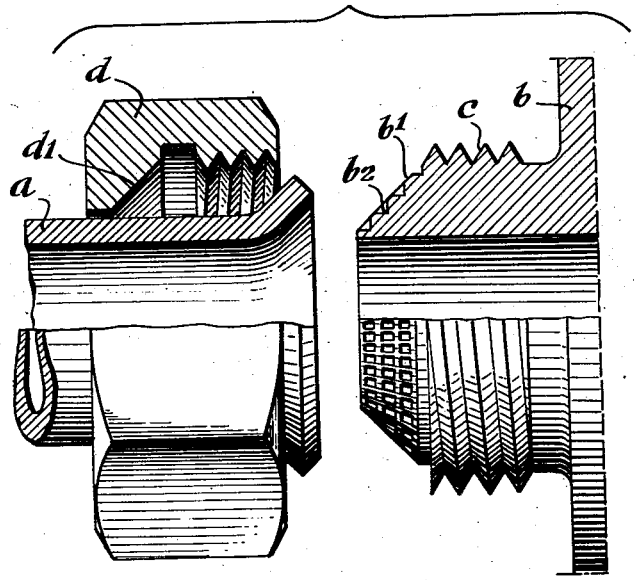
Figure 2:
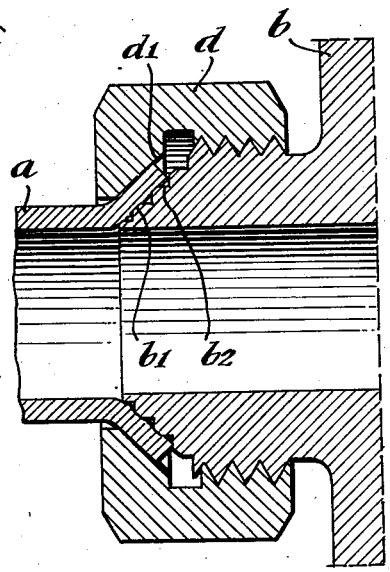
Fig. 2 shows a similar section, after the parts have been screwed up.
Figure 3:
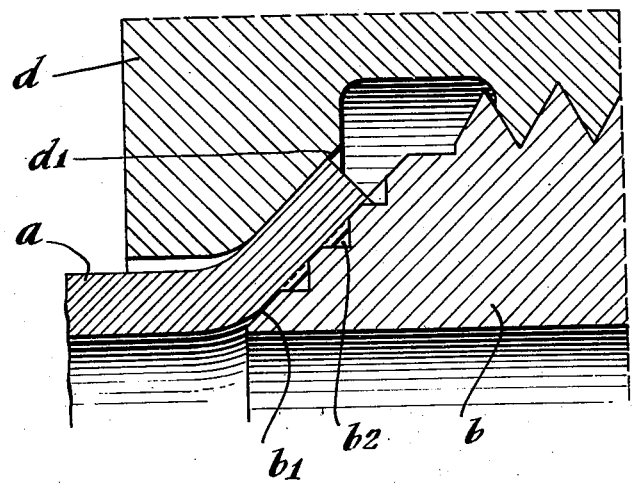
Fig. 3 is a detail view of parts of Fig. 2 on a larger scale.

Referring to Figs. 1, 2 and 3, $a$ designates the pipe to be connected, the end of which has been flanged and more particularly flared conically, preferably in such a way as to avoid the formation of a sharp angle. The reference $b$ indicates one of the coupling members having an external screw thread $c$ on which a second coupling member in the form of a nut $d$ can be screwed.

The inner surface $d_1$ of the nut is of the same taper as the flared mouth of the pipe $a$. The nut $d$ must either be placed on the pipe $a$ before the mouth has been flared, or, if this has already been done, the nut may be introduced over the other end of the pipe.

The coupling member $b$ has a conical seating $b_1$ for receiving the flared end of the pipe $a$, with which it must form a tight joint. The taper of this seating is the same as that of the surface $d_1$ of the nut $d$. The seating $b_1$ on the coupling member $b$ has closed hollows or cavities $b_2$. The cavities $b_2$ are preferably arranged in checkerboard or grid-like fashion, and become smaller towards the bottom. The walls of the cavities, against which the inner surface of the pipe to be connected is pressed, may be either parallel or substantially parallel to the axis of the pipe, or they may be at an angle thereto.

As will be seen, more particularly in Fig. 3, one of the walls of each of the cavities $b_2$ is parallel to the axis of the pipe, which has the advantage of permitting easy removal and re-connection of the pipe, because, when the cavities are of the form illustrated, the pipe $a$ can be separated from its seat $b_1$ by withdrawing it axially, without the material which has been forced into the cavities $b_2$ being able to hinder this operation. If the cavities $b_2$ were of a different shape, there would be a possibility that the material forced into the cavities might hinder the subsequent disconnection of the pipe.

In an exceptional case when it is desired to assemble the tube permanently so that any subsequent disconnection becomes impossible, it is preferable to slope one of the walls of the cavities in such a manner that the material which is forced into the cavities connection is tightened preventing withdrawal of the pipe when an axial pull is exerted on it.

The checkerboard or grid-like pattern of the cavities into which some of the material of the pipe is forced when the connection is tightened has the advantage that the cavities in the seating do not inter-communicate, so that all leakage, even that due to capillary action is practically impossible. With the grid-like pattern for the cell-like cavities there will be a multiplicity of cavities spaced from each other and arranged in a plurality of concentric rows. The outer surface of the partitions between the cavities and the outer surface of the seating portion to the sides of the rows of cavities is smooth. Each cavity is preferably substantially square or rectangular at the top.

On the other hand, since the pipe does not rotate with the nut on disconnection, its inner surface is not injured, and the joint can be reconnected with the same tightness as on the first assembly.

Since the pipe is firmly anchored to its seating, vibrations, torsional or tensile stresses exerted on the pipe cannot affect the tightness of the joint.

The pipe coupling of the present invention is mainly applicable to pipes made of material such that the end of the pipe can be flanged as by flaring without difficulty, for example, copper, lead, aluminum or light alloys, possibly also steel tubes, or for rubber pipes, or pipes of any other plastic or elastic material.

Fig. 4 shows the connection of two pipes—$e$ and $e_1$ the ends of which are conically flared. Instead of being pressed against a conical seating on one of the coupling members, as described in connection with Figs. 1 to 3, the ends of the pipes $e$ and $e_1$ are pressed against a bi-conical ring $f$ which is illustrated in detail in Fig. 5. The internal diameter $f_1$ of the ring $f$ is preferably equal to the internal diameter of the pipe to be connected. Its conical surfaces $f_2$ and $f_3$ are provided with cavities $b_2$ disposed in a checkerboard pattern. This ring can be provided with a conical grove $f_4$.

This form of pipe connection is assembled in the following manner: A coupling member $g$ provided at one end with a male screw thread $g_1$ has a conical seating surface $g_2$ the taper of which corresponds to that of the surfaces $f_2$ and $f_3$ of the ring $f$. A second coupling member or nut H having a female screw thread $H_1$ engages the male thread $g_1$ of the coupling member $g$. The nut H may have a conical seating surface of a taper corresponding to that of the surfaces $f_2$ and $f_3$ of the ring $f$ in the same way as the nut $d$ in Fig. 1. Instead of forming the nut with a conical seating, there can also be placed in the bottom a separate part I having a conical surface $I_1$, the taper of which corresponds to that of the surfaces $f_2$ and $f_3$ of the ring $f$ can be inserted in the nut as shown in Fig. 4.

When the coupling members $g$ and H are tightened, the conical surface $g_2$ of the member $g$ on the one hand and the conical surface $I_1$ of the part I on the other hand, force the material of the pipe into the cavities $b_2$ on the surfaces $f_2$ and $f_3$ of the bi-conical ring $f$. All the advantages of the connection shown in Figs. 1 to 3 are thus obtained for this form also.

Fig. 6 shows a pipe connection similar to that shown in Fig. 4, the only difference being that rings or flanges K and $K_1$ which are connected by means of bolts $K_2$ and nuts $K_3$ are used for tightening. The rings or flanges K and $K_1$ have conical surfaces $K_4$ and $K_5$, the taper of which corresponds to the taper of the surfaces of the bi-conical ring $K_6$, which is identical with the ring $f$ which is illustrated in Fig. 5.

Fig. 7 shows a pipe connection similar to that shown in Fig. 4. In this form of connection, the ends of the pipe, instead of being conically flared, are flanged so as to form rims L and $L_1$ which are perpendicular or substantially perpendicular to the axis of the pipes to be joined. The flanged rims L and $L_1$ are tightened by means of the coupling members $L_2$ and $L_3$ with a flat end against a gasket $L_4$ having a sunk checkerboard design $B_2$, as previously described, and as can be seen in Fig. 8.

Instead of pressing the flanged rim L or $L_1$ against a gasket $L_4$ provided with cavities $b_2$, the rim can be pressed, as in Figs. 1 to 3, directly against a seating on one of the coupling members, the seating in this case being perpendicular instead of conical.

Fig. 9 shows a coupling member M which is screwed into a cast port and of which the conical seating $b_1$ is provided with cavities arranged in a checkerboard pattern, the pipe being gripped between the coupling members in the manner described with reference to Figs. 1 to 3.

In Fig. 10 the coupling member N is identical with the member M shown in Fig. 9, but the end of the pipe is pressed against a bi-conical ring F the surfaces of which are provided with cavities arranged in checkerboard pattern, as described in connection with Figs. 4 and 5. In this case, one of the conical surfaces fits tightly into a conical bore $N_1$ of the member N.

The various forms of coupling which have been described by way of example, all have in common the characteristic feature that the seating for the inner surface of the pipe is provided with cavities, which are preferably arranged in the manner specified. The coupling can be used for joining tubes or pipes to faucets or taps or any other plumbing fittings, such as T-pieces, X-pieces, angle pieces, etc.

What I claim is:

1. In a coupling for a pipe having a flanged end, a member providing a seat for sealing engagement with said flanged end, said member containing a plurality of individual blind recesses spaced from one another and from the ends of said member, each of said recesses being surrounded by a substantially smooth area defined by said seat, and means for urging said pipe and member into sealing relationship.

2. In a coupling for a pipe having a flanged end, a member providing a seat for sealing engagement with said flanged end, said member containing a plurality of individual blind recesses spaced from one another and from the ends of said member, each recess having a wall substantially parallel to the axis of said member, each of said recesses being surrounded by a substantially smooth area defined by said seat, and means for urging said pipe and member into sealing relationship.

3. In a coupling for a pipe having a flanged end, a member providing a seat for sealing engagement with said flanged end, said member containing a plurality of substantially concentric rows of individual blind recesses spaced from one another and from the ends of said member, each of said recesses being surrounded by a substantially smooth area defined by said seat, and means for urging said pipe and member into sealing relationship.

HANS KREIDEL.